(12) United States Patent
Regnard et al.

(10) Patent No.: US 7,554,232 B2
(45) Date of Patent: Jun. 30, 2009

(54) PROTECTIVE COVER WHICH IS INTENDED TO BE MOUNTED ON THE REAR BEARING OF A ROTATING ELECTRICAL MACHINE, ALTERNATOR AND ALTERNATOR-STARTER COMPRISING ONE SUCH COVER

(75) Inventors: Benoit Regnard, Livry-Gargan (FR); Roger Abadia, Neuilly-Plaissance (FR); Philippe Lefrancois, Créteil (FR)

(73) Assignee: Valeo Equipments Electriques Moteur, Creteil (FR)

( * ) Notice: Subject to any disclaimer, the term of this patent is extended or adjusted under 35 U.S.C. 154(b) by 0 days.

(21) Appl. No.: 10/532,256

(22) PCT Filed: Oct. 24, 2003

(86) PCT No.: PCT/FR03/03168

§ 371 (c)(1),
(2), (4) Date: Dec. 2, 2005

(87) PCT Pub. No.: WO2004/040736

PCT Pub. Date: May 13, 2004

(65) Prior Publication Data

US 2006/0186747 A1    Aug. 24, 2006

(30) Foreign Application Priority Data

Oct. 25, 2002    (FR) ................................ 02 13379

(51) Int. Cl.
*H02K 13/00*    (2006.01)
(52) U.S. Cl. .......................... 310/71; 310/89; 310/239
(58) Field of Classification Search ............... 310/49 A, 310/71, 68 D, 89, 239–247
See application file for complete search history.

(56) References Cited

U.S. PATENT DOCUMENTS

| | | | | |
|---|---|---|---|---|
| 4,518,886 A | * | 5/1985 | Kaneyuki | 310/71 |
| 4,546,280 A | * | 10/1985 | Pfluger | 310/68 D |
| 4,705,983 A | * | 11/1987 | Franz et al. | 310/68 D |
| 4,841,182 A | * | 6/1989 | Tsuchiya et al. | 310/68 D |
| 5,006,742 A | * | 4/1991 | Strobl et al. | 310/88 |
| 6,034,452 A | * | 3/2000 | Nakamura et al. | 310/68 D |

(Continued)

FOREIGN PATENT DOCUMENTS

DE    19605757 A1  *  8/1996

(Continued)

*Primary Examiner*—Dang D Le
(74) *Attorney, Agent, or Firm*—Osha • Liang LLP (57) ABSTRACT

The invention relates to a protective cover which is intended to be mounted on the rear bearing (14) of a polyphased rotating electrical machine, such as an alternator or an alternator-starter for a motor vehicle. The inventive cover is of the type that consists of: an outer frame comprising a rear bearing and supporting a polyphased wound stator, the phase outputs thereof being connected to a phase connector (102); and a support which is made from an electrically-insulating material, which is mounted in a fixed manner to the rear bearing and which supports the phase connector (102). The cover is designed both to support the phase connector and to cover the rear bearing. The invention also relates to an alternator and an alternator-starter comprising one such cover. The invention is suitable for alternators and alternator-starters for motor vehicles.

25 Claims, 5 Drawing Sheets

U.S. PATENT DOCUMENTS

| | | | |
|---|---|---|---|
| 6,034,464 A * | 3/2000 | Asao | 310/263 |
| 6,424,065 B1 * | 7/2002 | Vlemmings et al. | 310/89 |
| 6,509,652 B2 * | 1/2003 | Yumita | 290/54 |
| 6,563,241 B2 * | 5/2003 | Hayashi et al. | 310/71 |
| 6,756,712 B1 * | 6/2004 | Schuren | 310/71 |
| 6,794,777 B1 * | 9/2004 | Fradella | 310/74 |
| 6,831,382 B1 * | 12/2004 | Lyle et al. | 310/89 |
| 7,005,767 B2 * | 2/2006 | Oh et al. | 310/89 |
| 2001/0022477 A1 * | 9/2001 | Ishida | 310/89 |
| 2001/0054853 A1 * | 12/2001 | Hayashi et al. | 310/71 |
| 2002/0158523 A1 * | 10/2002 | Abadia et al. | 310/68 B |
| 2004/0051404 A1 * | 3/2004 | Kurosawa et al. | 310/49 R |
| 2004/0256928 A1 * | 12/2004 | Kondo et al. | 310/68 D |
| 2005/0023912 A1 * | 2/2005 | Lin et al. | 310/89 |
| 2005/0073204 A1 * | 4/2005 | Puterbaugh et al. | 310/89 |
| 2005/0121988 A1 * | 6/2005 | Howe et al. | 310/90 |
| 2005/0168082 A1 * | 8/2005 | Kondo et al. | 310/68 D |
| 2006/0043805 A1 * | 3/2006 | Bradfield | 310/68 D |
| 2006/0119197 A1 * | 6/2006 | Puterbaugh et al. | 310/87 |

FOREIGN PATENT DOCUMENTS

| | | | |
|---|---|---|---|
| EP | 1 024 582 A2 | | 8/2000 |
| EP | 1024582 A2 * | | 8/2000 |
| FR | 2 730 875 A1 | | 8/1996 |
| FR | 2730875 A1 * | | 8/1996 |
| FR | 2 783 648 A1 | | 3/2000 |
| FR | 2783648 A1 * | | 3/2000 |
| JP | 60245448 A * | | 12/1985 |
| JP | 05176505 A * | | 7/1993 |
| JP | 2002017067 A * | | 1/2002 |
| JP | 2002315397 A * | | 10/2002 |
| JP | 2005033985 A * | | 2/2005 |

* cited by examiner

PROTECTIVE COVER WHICH IS INTENDED TO BE MOUNTED ON THE REAR BEARING OF A ROTATING ELECTRICAL MACHINE, ALTERNATOR AND ALTERNATOR-STARTER COMPRISING ONE SUCH COVER

BACKGROUND OF INVENTION

1. Scope of the Invention

The invention concerns a protective cover intended to be mounted on the rear bearing of a polyphased rotating electrical machine, particularly an alternator or alternator-stator for an automobile vehicle.

2. State of the Technology

Rotating electrical machines of the type that consist of an outer frame equipped with a front bearing and a rear bearing, a rotating rotor shaft mounted in the front and rear bearings of the frame, a rotor supported by said shaft and equipped with a field coil connected by electrical links to two slip rings carried by the rear end of the shaft, a coiled stator surrounding the rotor and equipped with several phases, the outlets of which are connected to a phase connector for connection to an exterior electronic module, a phase connector support of an electrically insulating material, fixed-mounted on the rear bearing and a cover that is fixed-mounted on the rear bearing, which covers at least one brush holder, the brushes of which are intended to act as supports on slip rings integrated with the rear end of the rotor shaft and connected to at least one field coil comprising the rotor.

In this machine, the cover covers the support of the phase connector, which is one piece with a brush-holder, which houses brushes up against said slip rings and with one brush-holder connector for linking the brushes to the electronic module containing an alternating current rectifying device of the coiled stator.

Such a machine is described in document WO 01/69762.

Figure 1:
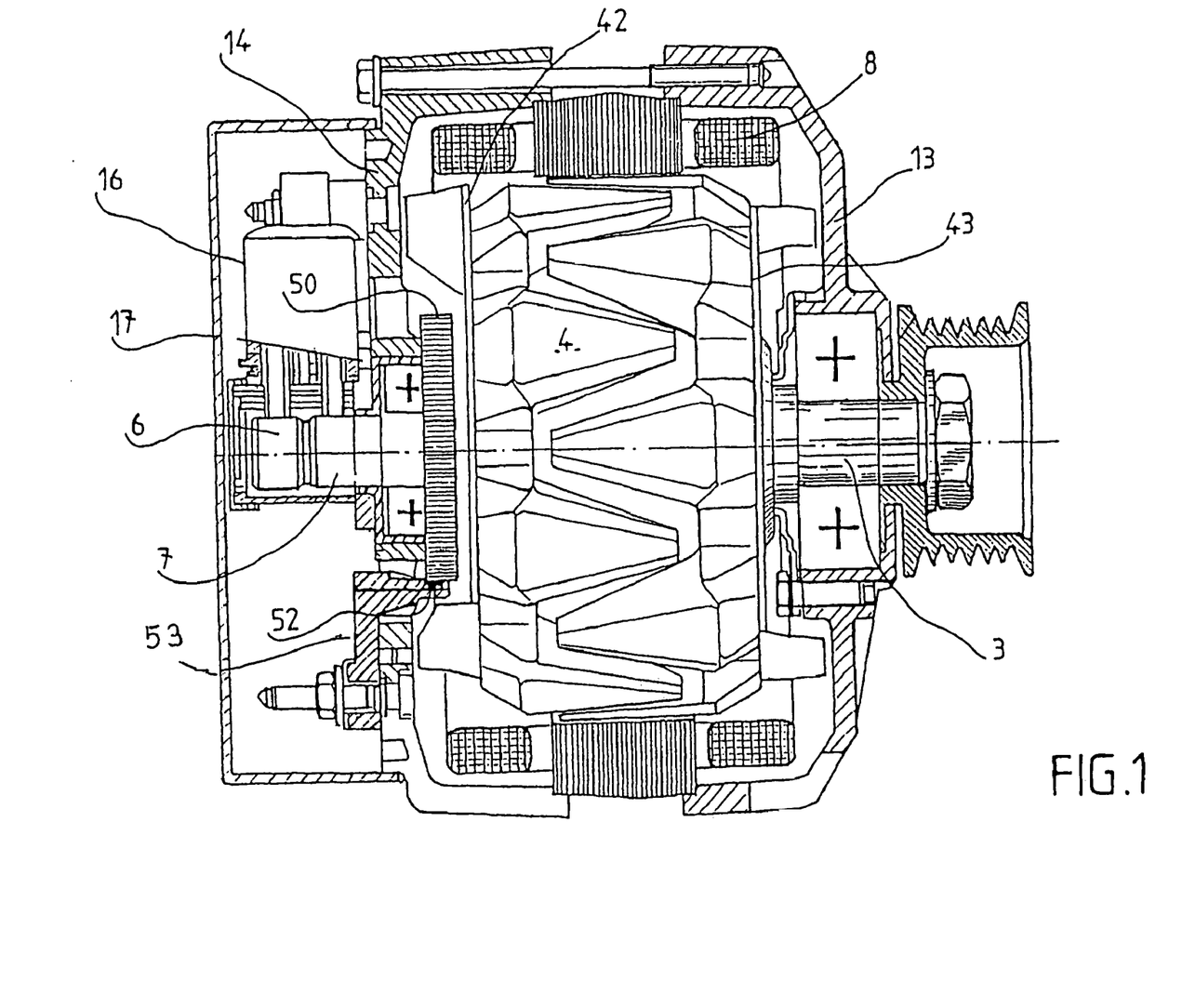
FIG. 1 is a cross-section of a polyphased rotating electrical machine, equipped with a device to support and cover the phases in accordance with the technology.

FIG. 1, which reproduces FIG. 1 of this document, but eliminates the references to parts and components that are not necessary for an understanding of the invention, shows a protective cover 17, which covers the rear bearing 14 and, with the bearing, the brush-holder referenced 16, the brushes of which are shown in the application against the slip rings 6, 7 connected by wire links to the field coil as explained in document WO 01/69762.

The cover is attached to the rear bearing. The brushes are connected electrically to a voltage regulator mounted on the outside of the machine. In this case, the voltage regulator belongs to the electronic module, which is an electronic command and control module. More specifically, as the rotating electrical machine is an alternator-starter in this case, this electronic module is comprised of a power module that includes the rectifier device, and a module for control and interface with the onboard network of the vehicle and/or with the control module of the vehicle's internal combustion engine. This control module manages the power functions in alternator and starter modes, regulation in alternator mode, and the transition from starter mode to alternator mode. As a variant, when the machine is an alternator, the electronic module is simplified, since the control module does not have to manage the transition function from starter mode to alternator mode; the machine runs only in alternator mode. The rectifier device of the power module may, in this case, have only diodes.

FIG. 1 also show at 3 the shaft of the machine, at 4 the rotor with clamps integrated in rotation with the shaft 3 and holding the field coil between its two polar wheels, the stator at 8, the front bearing at 13, and the rear and front fans at 42 and 43 which are integrated in rotation with the rotor 4.

In a variant, the rotor has projecting poles and is comprised of several field coils, as described for example in document WO 02/054566, and as mentioned in the aforementioned document WO 01/69762. The machine in a variant is cooled by fluid circulation; at least one of the two bearings 13, 14 is hollow for fluid circulation, such as the cooling fluid of the thermal motor of the vehicle. The presence of the fans is not, therefore, required. In a variant, only the rear fan is present.

This machine presents an axial axis of symmetry (not referenced in FIG. 1), which is merged with the axis of the shaft 3, and which defines the axis of rotation of the rotor and the radial and axial directions of the machine. The front 13 and rear 14 bearings are connected together, by rods, one of which is visible in FIG. 1, to form an outer frame intended to be mounted on a fixed part of the automobile vehicle. This frame serves as the housing and support for the stator 8 and the rotor 4.

For this purpose, the frame carries the stator 8 fixed on its outside periphery and the shaft 3 centrally in rotation. To do this, the bearings 13 and 14 each carry centrally a ball bearing for rotating mounting of the shaft 3, the front end of which carries a pulley intended to be connected through a belt transmission device to the internal combustion engine of the automobile vehicle, while the rear end of the shaft 3 carries the rings 6,7.

The bearings 13, 14 present on the external periphery an annular skirt with an axial orientation, and each presents, inside, at the free end, a change in diameter to axially lock and center the body presented by the stator 8 inserted between the free ends of the skirt of the bearings 13, 14.

Thus, this stator 8 has a grooved body, traditionally formed by a packet of sheets, supporting field coils crossing the body of the stator along the grooves of the stator to extend in an axial projection on either side of this body in order to define a front chignon and a rear chignon partially surrounding the front fan 43 and the rear fan 42 respectively to be cooled by the fans. The number of field coils depends on the number of phases of the electrical machine. Coils are made in the known manner by winding an electrical wire or bars in the grooves of the body of the stator, shaped for example in a U, in which the ends of the branches are connected by welding to form the winding.

In a known manner, the rear chignon is comprised of outlets, known as phase outlets, that cross the rear bearing to the openings of the bearing, as shown (for one of them for example) in the lower part of FIG. 1a of document EP A 210090, to be connected as described below to a phase connector via phase connection inputs and electrical tracks.

Figure 2:
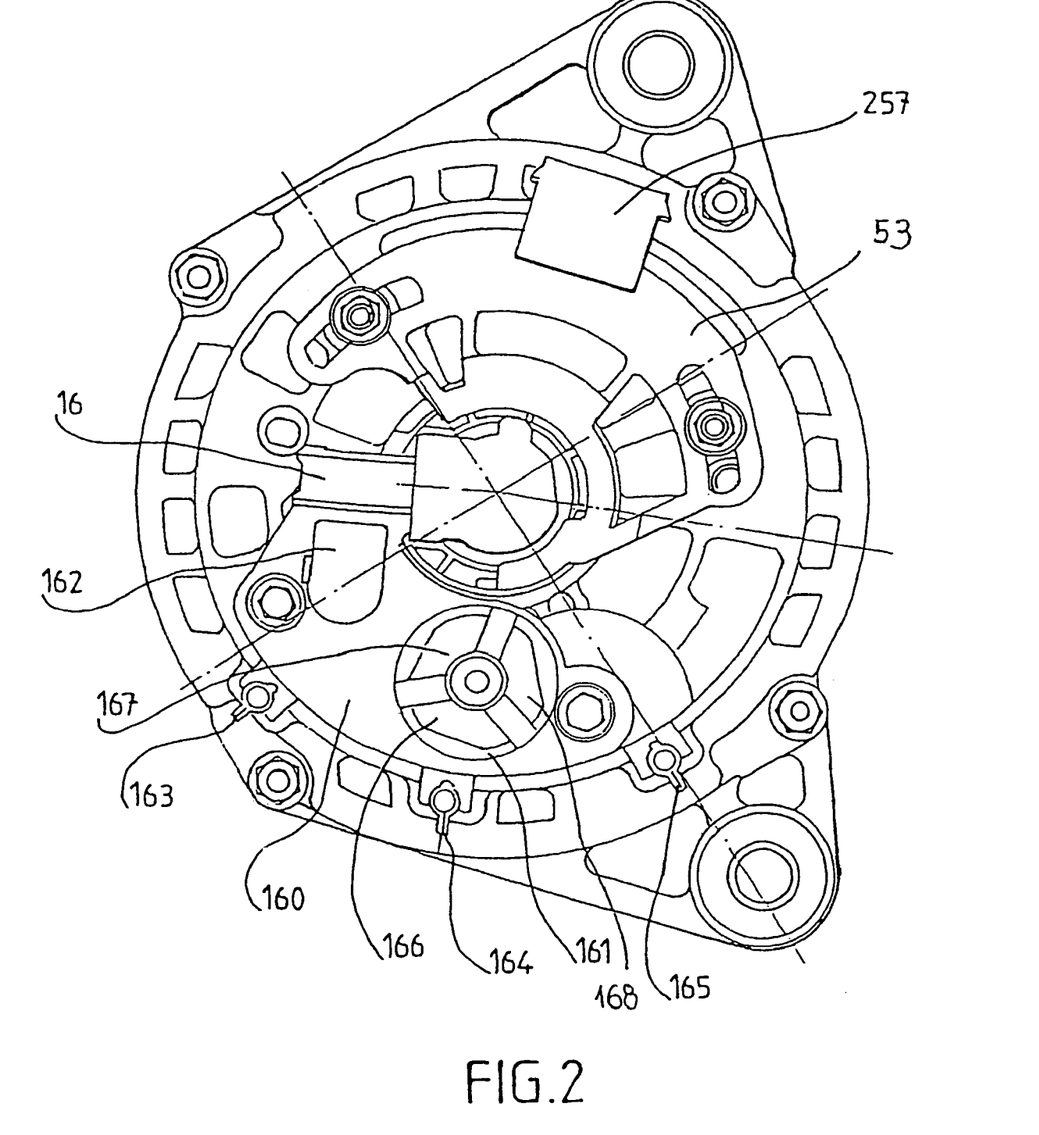
FIG. 2 is a view of a support of the electrical connections of the device according to FIG. 1.

The machine shown is an alternator-starter comprised of means to track the rotation of the rotor 4. These means are magnetic and have a radial read reluctor 50, which is carried by a reluctor-holder part, which is known but not shown, and sensors 52 carried by a sensor holder indicated at 53. This sensor holder 53 has at least one protuberance crossing an opening of the rear bearing 14 for installation of the sensors 52 opposite the reluctor 50 and the reluctor radial reader. This sensor holder is supported by the rear bearing 14 and is in contact with the rear surface of the bearing 14. As shown in FIG. 2, the sensor holder 53 has two wings with oblong openings (not referenced) for angle adjustment; it is locked using washers and nuts screwed on studs mounted in the rear bearing 14, one of which can be seen in FIG. 1, which cross the oblong openings. The sensor holder 53 is mounted and screwed between the bearing 14 and the washers supporting the nuts.

In the protective and phase support device, containing the cover 17 and the phase support according to document WO 01/69762, the brush holder and the sensor holder each have a connector to connect respectively the brushes and the sensors to the electronic command and control module installed on the outside of the machine and, more specifically, to the voltage regulator, which drives the field coil of the rotor 4, and to the device rectifying the alternating current produced by the coiled stator of the alternator-starter when it operates in generator mode; this voltage regulator device is part of the electronic module as cited above.

Thus, we see at 257 the connector of the sensors 52 supported by the sensor holder 53 and, at 162, the connector of the brush holder 16. Electrically conducting tracks sunk in the sensor holder 52 made of electrically insulating material connect the connector 257 to the sensors 52. As FIG. 8 of this document shows, the connector 162 of the brush holder 16 is mounted on a support designated with the reference 160, made of an electrically insulating material, which is in the general form of a disk and is mounted on the rear bearing 14 with two studs. FIG. 2 attached reproduces this FIG. 8.

On this figure, we see on the periphery of the support three connection inputs for the phases designated by the references 163, 164 and 165, each intended to receive a mounted phase output of the windings of the stator (triphased here). These inputs are connected by electrically conducting tracks, which are sunk in the support 160, to the first electrical contact faces 166 to 168. The faces 166 to 168 are placed on an extension of the support 160 and are part of a first connection sub-assembly 161, called the phase connector for reasons of simplicity, so that a device for electrical connection of the stator phases is formed comprised of the phase connector, the electrically conducting tracks, and the phase connection inputs.

A second sub-assembly with additional electrical contact faces, male in this case, is intended to be mounted on the connector 161, female in this case, to form a first connector that connects the phases of the stator to the exterior command and control module via electrical cables, and a second connector, the same type as the first connector, comprising a second phase connector partially carried by the electronic module. The first connector-cables-second connector assembly constitutes an electrical connection device between the machine and the electronic module.

The first connector is described in greater detail in document FR 2 819 943. We will refer for more details to the two documents from the known technology just cited.

In the protective and support device of the phase connector of the rotating electrical machine, which is known, the second sub-assembly of the first phase connector splits axially into the extension of the support 160 and the cables that go to the electric module are oriented in the radial direction of the machine, at the output of the second sub-assembly, the position of which is imposed by the extension of support 160. This extension is close to the brush holder 16.

Now, in certain applications, it would be preferable to remove the cables differently, for example for issues of size related to the presence of parts or walls adjacent to the machine.

PURPOSE OF THE INVENTION

The purpose of this invention is to propose a solution to this problem.

To achieve this goal, the cover according to the invention is characterized in that it is configured to perform simultaneous functions to support the phase connector and to cover the rear bearing.

Thanks to the invention, we have broad latitude to position the phase connector and the cover performs a double function that simplifies the brush holder. We can circumferentially move the phase connector away from the brush holder, despite the presence of the sensor holder.

This variable positioning of the phase connector in relation to the brush holder allows us to pass the connection cables into free spaces based on applications.

For example, when the bottom of the cover is axially close to a part or a wall, the phase connector is oriented in a direction that allows radial access to the phase connector, i.e. generally perpendicularly to the phase connector of previous technology, so that the cables can be extended axially or slanted and the axial size of the machine equipped with the first connector is reduced.

The phase connector in one fabrication method projects out from the external periphery of the cover. It is oriented in a direction that is radial or axial or tangential to the machine. In a variant, the phase connector is angled in relation to the axial direction of the machine. Thus, the phase connector can be accessed axially or radially (or combined) in a space where there is room.

In this fabrication method, the phase connector extends out from the external periphery of the rear bearing or is recessed in relation to this external periphery; this choice depends on the application and the available space.

In another fabrication method, the phase connector is installed in the thickness of the cover.

In a variant, it projects axially in relation to the cover; for example, it is carried by the bottom of the cover.

With the invention, because the phase connector can be moved away from the brush hold and not be disturbed by questions of size, we can increase the size of the extension of the phase connector and, as a result, increase the number of electrical contact faces so that the machine can have a larger number of phases. Of course, thanks to the invention, the phase connector may have another shape, for example the shape described in document GB 2 354 641 A.

Thanks to the invention, space is freed up within the cover so that we can form a brush holder-voltage regulator assembly.

The invention is applicable to a traditional alternator without a sensor holder.

In the context of this application, we can radially install the phase connector deeper inside in the space freed up by the sensor holder.

According to one characteristic of the invention, the phase connector of the stator is arranged on the external periphery of the cover and is supported by a projection in the form of arms coming from the cover.

This arrangement allows the passage, between the arms, of a support tab integrated with a mounting rod presented by said connector. This tab is intended to be mounted, for example by screwing on the rear bearing, so that we obtain a solid phase connector, particularly when the second sub-assembly of the first connector is installed.

In one variant, according to one characteristic of the invention, the phase connector is offset by the projection, in this case through the support arms, to a location beyond the external periphery of the cover. This arrangement facilitates access, particularly radial access, to the connector.

According to another characteristic of the invention, the phase connector is connected to connection inputs of the phase outputs of the stator, for example in the form of phase output mounting tabs, by electrically conducting tracks sunk, at least partially, in the project, for example in the support arms; the cover is of an electrically insulating material. As a variant, the electrically conducting tracks are extended and are carried by the bottom and/or the external periphery of the cover. The phase connection inputs extend, in one fabrication method, to the external periphery of the cover.

The cover has an additional function to protect the electrical tracks. One will also appreciate that the electrical tracks rigidify the cover and the arms. When the number of contract tracks is larger than three, in one fabrication variant, the support tab is eliminated.

As a variant, the electrical tracks are replaced with electrical conductors, for example, with a circular, rectangular or oval section, such as electrical wires, at least partially sunk in the projection and/or the cover.

A portion of the electrical tracks is, in one variant, replaced with electrical wires. All combinations are possible.

One will also appreciate that the position of the phase mounting tabs or, generally, of the stator phase connection inputs, may vary as a function of the application and, in particular, of the space available. The electrically conducting tracks may be carried by the bottom and/or the skirt and/or the projection of the hollow cover.

In a variant, the projection consists of a boss. More specifically, in a variant, the two arms are replaced with a full boss, which results from molding with the cover, in which the electrical tracks and, possibly, the support tab are sunk; the presence of the support tab is no longer necessary in certain applications.

In all cases, the form, orientation and location of the projection allows the orientation in space of the phase connector, which is thus located in the most appropriate position.

According to another characteristic of the invention, the connector of the brush holder is mounted on the bottom of the cover; it is oriented radially or axially or in a combined way.

According to another characteristic of the invention, the brush holder connector is made in one piece with the cover, which thus has a new function.

According to another characteristic of the invention, the brush holder connector is connected to the brush holder through electrically conducting tracks, or any other form of electrically conducting conductors such as electric wires, sunk in the bottom of the cover. These tracks rigidify the cover and standardize and simplify the brush holder.

Thus according to another characteristic of the invention, and economically, the brush holder is made in the form of a separate piece mounted under the bottom of the cover, which thus covers the brush holder. The quantity of material in the brush holder is reduced, given that this material is more costly, because its function is to guide the brushes, than the cover material. With these arrangements, in one fabrication variant, the cover is in two parts, i.e. a first part that includes the phase connector and its associated electrical tracks, and a second part comprised of the connector of the brush holder and the associated electrical tracks.

This form of fabrication allows increased standardization. In effect, the second part may be the standard type and the first part adaptable to the application and the environment. Thus, the phase connector may have an axial or radial orientation or a combined orientation, and its placement may vary circumferentially. On the other hand, the opposite can be done where the first part is standardized; the second part is adaptable.

According to another characteristic of the invention, for an alternator-starter that has a sensor holder and a connector for the sensor holder, the sensor holder is mounted under the bottom of the cover and the connector of the sensor holder passes radially through a hollow in the external peripheral skirt of the cover.

In a variant, the sensor holder is integrated in the cover, which in this case advantageously carries the three connectors: phase, brush holder and sensor holder. These connectors may have radial or another access, primarily because the cover is made of moldable plastic. One of the connectors may be inclined and the other globally radial; all combinations are possible depending on the available space. At least one of these connectors is female in one variant.

Advantageously, the sensor holder is, in this case, fixed in rotation; an electronic device is installed to adjust the sensors in relation to the reluctor.

Of course, in a variant, the connector of the brush holder does not belong to the cover; the brush holder then carries its connector.

Thus, when the cover is in two parts as described above, the second part is, in a variant, equipped with a standard brush holder with integrated connector.

BRIEF DESCRIPTION OF DRAWINGS

The invention will be better understood and other purposes, characteristics, details and advantages of the invention will appear more clearly during the explanatory description to follow, referencing the schematic drawings attached given only as an example illustrating one method of fabrication of the invention, in which.

DESCRIPTION OF PREFERRED METHODS FOR FABRICATION OF THE INVENTION

Figure 3:
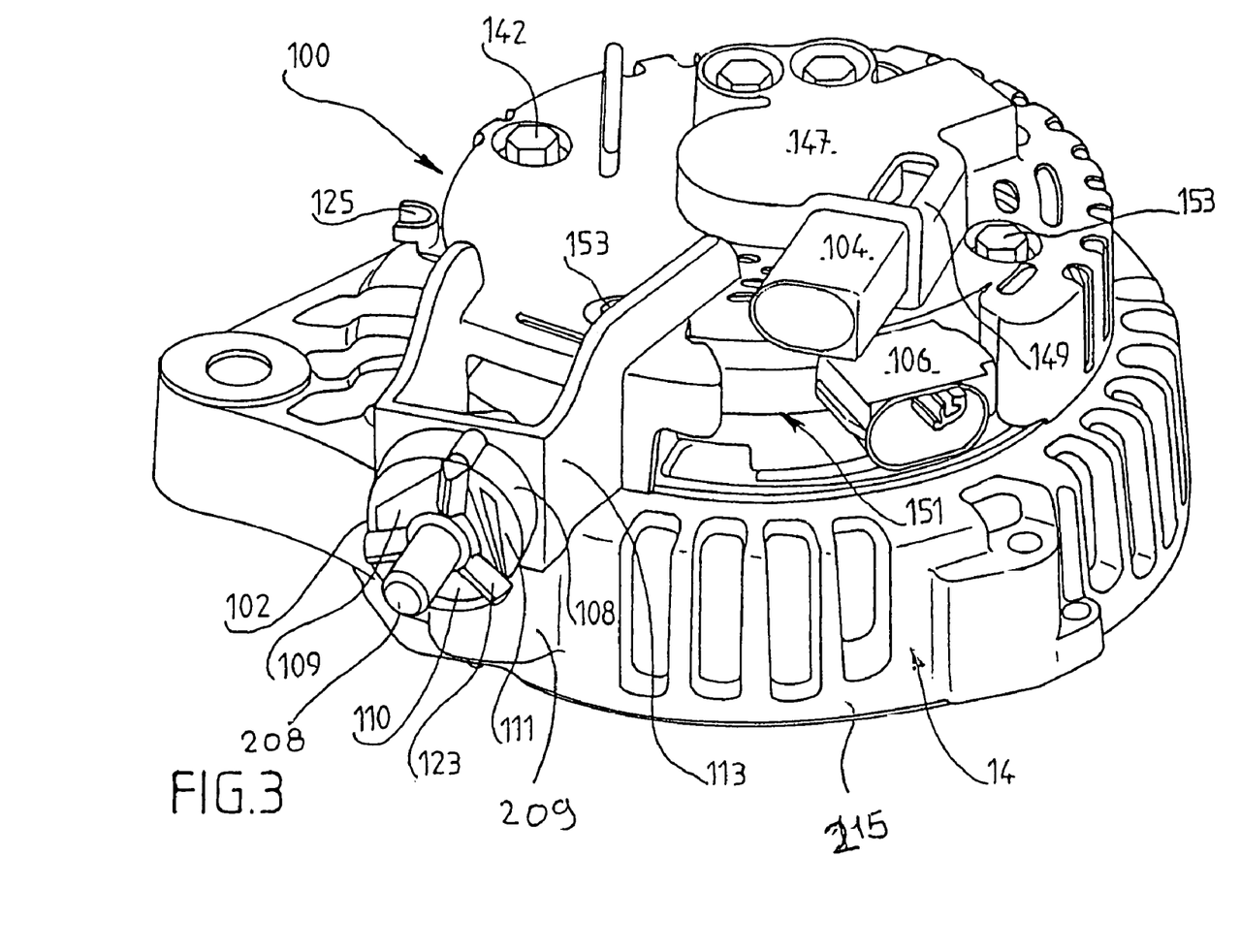
FIG. 3 is a perspective of a support and cover device for the phases of a polyphased rotating electrical machine, according to the invention, according to the technology, mounted on the rear bearing of the machine.

FIG. 3 shows a first example of fabrication of a protective cover according to the invention, mounted on the rear bearing of a rotating electrical machine of the type shown in FIG. 1. In the case of FIG. 3, the cover is adapted to be used for an alternator-starter, to the extent that the rear bearing carries, as in FIG. 2, the sensor holder.

In FIG. 3, the rear bearing is referenced 14, already used in FIG. 1. The cover is designated by reference 100 and the connector of the sensor holder, angularly adjustable, is referenced 106. This rear bearing, aluminum-based here, is, in a known manner, hollow in shape and has, as seen in FIG. 1, a bottom with transversal orientation, in relation to the axial axis of symmetry in this FIG. 1, extended at its external periphery by an annular edge, in the form of an external peripheral skirt, with an axial orientation that has air outlet openings (not referenced) for the air to exit. In FIG. 3, this annular peripheral skirt is referenced 215. The bottom of the bearing 14 shows air inlets visible in FIG. 1. The skirt 215 also has openings, axially oriented here (FIG. 3), so that, in the known manner, when the rotor of the machine turns, air circulation is generated by the rear fan 42 of FIG. 1 between the air inlets and the air outlets to cool the rotor and the stator of the machine.

Figure 7:
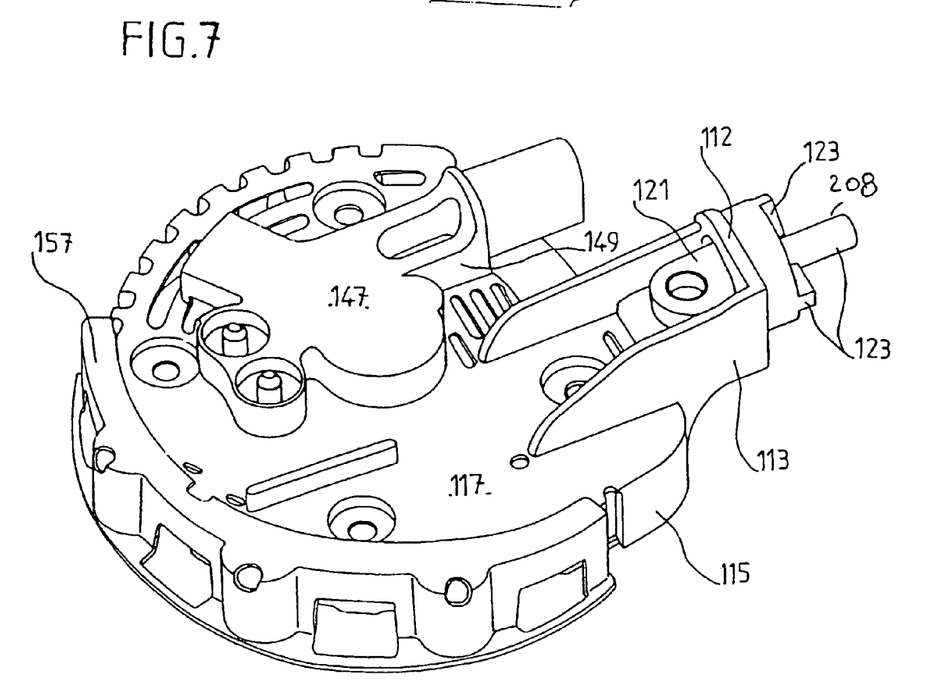
FIG. 7 shows the cover of FIG. 4, completed with a cover element to protect the phase output mounting tabs.

To do this, the cover 100, hollow in shape, has air passage openings (not referenced), which can be seen better in FIGS. 3 and 7. This perforated cover 100 has a bottom, generally with a transversal orientation, and extended at its external periphery with a axially oriented generally annular peripheral skirt.

In FIGS. 3 to 5 and 7, we have referenced at 115 and 117 respectively the external peripheral skirt that forms a belt and the bottom. The air passage openings are installed in the skirt 115 and the bottom 117 as visible in FIGS. 3 to 5 and 7. These openings are oblong in shape. Thus, the skirt 215 presents oblong openings, with an axial orientation, and the bottom has the oblong openings, in circumferential or rectilinear form between the connectors 102 and 104 described below. In the left part of FIG. 3, we see that the bearing 14 has, in a known manner, a projecting wing for mounting the machine on a fixed part of the automobile. In a variant, the bottom of the bearing 14 is not perforated when the machine is cooled by fluid circulation.

The cover 100 is designed to perform the functions of the protective cover 17 and the support 160 of the first connection sub-assembly 161 of the known device according to FIG. 2 where these functions are performed by separate elements.

In the first fabrication example, the cover 100 delimits a cavity inside which are housed the brush holder 135 and the sensor holder; this cavity is closed by the bottom of the rear bearing 14 on which the protective cover is mounted, which covers the brush cover and the sensor cover.

As we see on FIG. 3, for this purpose, the cover 100, which is made of an electrically insulating material, advantageously made of moldable plastic, carries (projecting) at its external periphery the two connectors to the exterior command and control electronic module, via cables/electrical wires not shown; i.e., the connector 102 forming the first connection sub-assembly of the three phases of the stator, named below for convenience a phase connector and the brush holder connector 104. The three connectors cited above 102, 104, 106 are oriented toward the outside through the axis of the machine and project from the skirt 215 of the bearing 14. These connectors are grouped into the same zone and are radially accessible from the outside. They will be named radial connectors for reasons of simplicity.

As shown in FIG. 3, the cover 100 has an opening 151, here hollow, circumferentially oblong for passage of the connector 106. We can access the connectors radially, and the connectors 102, 104 are offset axially toward the outside in relation to the bottom 117 of the cover 100, i.e. toward the outside in relation to the external surface of the bottom 117. The skirt 115 is not annular at the level of the connectors 102, 104, which each extend perpendicularly to the skirt, and connector 102 is offset toward the outside in relation to the connector 104.

In a variant, the skirt 115 is annular at the level of the connectors which then extend radially. The connector 102 projects toward the outside, in a direction opposite the axis of the machine, in relation to the connector 104.

The phase connector 102 corresponds to the connector described in the documents WO 01/68762 and FR 2 819 943. The phase connector includes the cylindrical protuberance now designated by reference 108 and the first three electric contact faces 109 to 111 arranged on this protuberance, as well as a threaded part 208 used to mount the second, additional sub-assembly (not shown) of the first connector. The connector 102 extends toward the outside as cited above because its threaded part 208 extends toward the exterior in the opposite direction to the machine. The threaded part 208 generally extends radially in relation to the radial direction of the rotating electrical machine and is radially accessible from the outside.

The number of contact faces depends on the number of phases of the alternator-starter. A minimum of two contact faces are provided, because the alternator-starter is the polyphase type. As a variant, this number is greater than three, because of the remote position of the phase connector in relation to the brush holder described below; this position increases the size of the protuberance 108 and, therefore, the number of contact faces. Likewise, this position allows another configuration of the phase connector which, for example, may have the form described in the document GB A 2 354 641 or any other form.

Connector 102 is offset to make a projection of the cover 100, in the form of a support arm 113, radially toward the exterior so that, at the external periphery of the cover, it projects radially from the exterior peripheral skirt 115 of the cover and from the skirt 215 of the bearing 14. As can be clearly seen in the figures, there are two support arms 113 which are made in one piece, by molding here, and the cover is partially integrated with the transversally oriented bottom 117 of the cover and of the exterior peripheral skirt 115.

By forming the arms 113, we see that one can modify the axial position of the protuberance 108 and the threaded part 208 in the form of a rod. One can also bend the arms to bypass an obstacle.

The two arms 113 have at their end, which is then on the outside of the external periphery of the cover, a flange 112 oriented perpendicularly to the arms 113. The flange 112 thus connects the arms 113 and has, on the outside surface, the protuberance 108 of the first phase connector 102.

The protuberance 108, which is cylindrical in the fabrication example, here comes from molding with the arms 113, the flange 112 and the cover 100 economically in thermoplastic material. The radially internal surface of the support flange 112 has a support tab 121 for mounting to the rear bearing 14.

This tab 121 is a means for attaching the projection, comprised of the two arms 113 and the flange 112, to the rear bearing 14. The tab 121 extends between the two arms 113 perpendicularly to the support flange and is integrated with the threaded part 208 intended to cross the box and the presser cover presented by the second additional sub-assembly of the first connector as described in the aforementioned document FR A 2 819 943.

FIG. 3 shows at 209 a molded chimney from the rear bearing, the free end of which supports the tab 121 drilled for the passage of a mounting element to the chimney 209. Here, the element consists of a screw that screws into a screw tap on the chimney 209 at its free end. As a variant, the element is a rivet. The connector is robust because, during the mounting of the second connection sub-assembly of the first connector by screwing a nut on the threaded part 208, in the form of a rod, this part 208 and the protuberance 108 are supported.

More specifically, the tab 121 is of one piece with the threaded part 208 and replaces the head of the screw in the earlier technology. The tab 121, as can be seen better in FIG. 8, projects at the level of its connection with the threaded part 208. This projection is in the form of a washer that has two edges to angularly index the entire threaded part 208-tab 121.

Figures 6, 8:
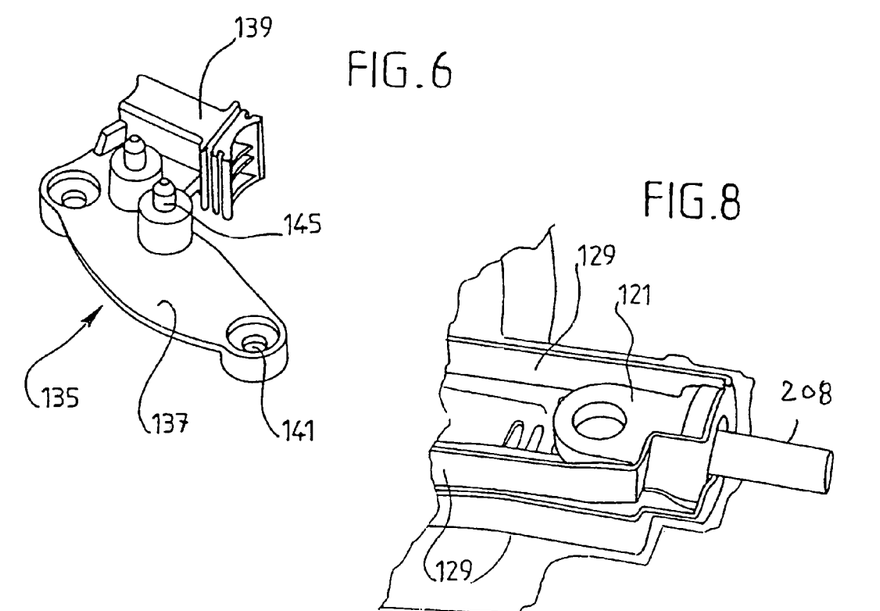
FIG. 6 is a perspective of a brush holder according to the invention.
FIG. 8 is a perspective, on a larger scale, of the detail indicated by Arrow VII in FIG. 5.

To do so, this projection engages into an additional counterbore made in the flange 112 and the protuberance 108 that is hollow inside. The bottom of this counterbore consists of a drilled part for passage of the rod 208. This part consists here of a washer made of thermoset plastic resistant to creep. This washer is advantageously mounted inside the protuberance 108 using the technique of molding in a casting and acts as a stop to the projection of the tab 121. As a variant, the contour of the counterbore has beads to cooperate with the edges of the projection of the tab 121.

The three electric contact faces 109 to 111, which are placed on the protuberance 108, are separated from each other by projections 123 intended to penetrate in slots in the pressure zone of the second sub-assembly of the first connector, described in the aforementioned document FR A 2 819 943, to block this second sub-assembly in rotation. The threaded part 208 crosses the protuberance 108 and a socket to which the projections 123 are connected, as seen in FIG. 3. The faces 109 to 111 are each electrically connected to a phase connection input 125 in the form of a phase output mounting tab 125 of the windings of the stator. This tab 125, which is on the external periphery of the cover, in a zone at a distance from the connector. This electric link is achieved through electric conductors which are here in the form of electrically conducting tracks 127 sunk in the cover. The tracks 127, the inputs 125 and the faces 109 to 111 are advantageously metal and obtained by cutting and bending.

Figure 5:
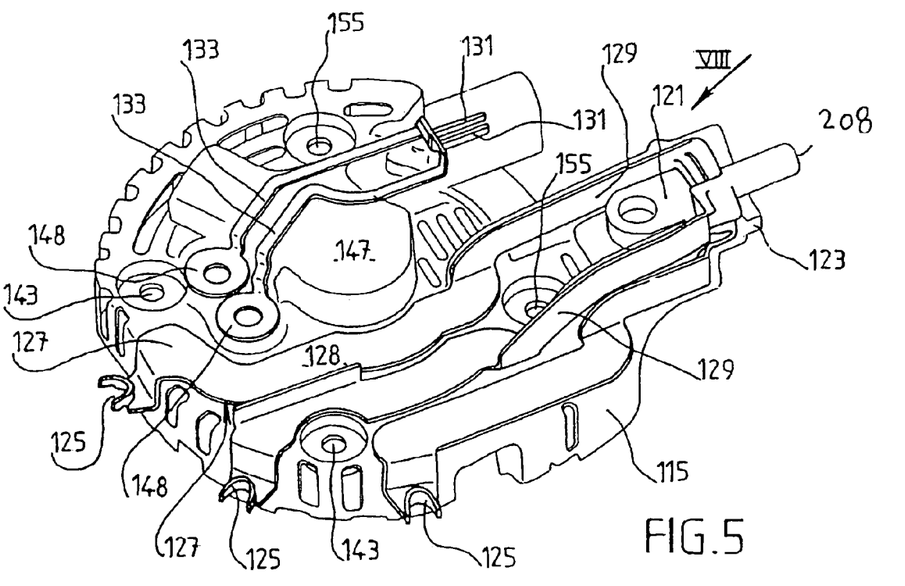
FIG. 5 is a perspective of the cover according to FIG. 4, showing it in the fabrication state before molding in a casting, to show the electrically conducting tracks which are sunk in the cover.

We see that each track 127 has, first, a portion 128 that is principally sunk in the bottom 117 of the cover and by bending in the skirt 115 of the cover at the level of the terminal tab 125 and, second, a portion 129 that is bent in relation to the first portion 128, in a 90° angle to be sunk into a support arm 113. FIGS. 5 and 8 clearly show that two portions of the track 129 molded in a casting in an arm 113, while the third portion is in the other arm. The free ends of the track portions 129 are configured so they can be sunk into the support flange 112 and the protuberance 108 on the outside surface of which they form three electrical contact faces 109 to 111. The faces 109 to 111 extend perpendicularly to the axis of the rod 208. As a variant, they extend and are slanted in relation to the axis of the rod. As a variant, the faces 109 to 111 have a cambered shape or a pointed form, in a V for example, or possibly in the form of a well with a truncated lateral wall. Of course, the second sub-assembly of the connectors has electrical contact faces in a complementary shape. All these variants increase the surface of the electric contacts. As a variant, the rod 208 is replaced by a chimney, which is truncated for example, with elastically formable tabs at the free end in the form of a mounting hook for rapid mounting by locking the second sub-assembly on the phase connector 102. To ensure a higher-energy contact, the rod is, in a variant, threaded on the inside or outside for tightening the two sub-assemblies of the connector using respectively a screw or a nut. Mounting by locking is then used to pre-position the two sub-assemblies.

In this case, the second sub-assembly has a plate with an opening crossed by the chimney, and the hooks of the chimney catch the upper surface of the plate. The lower surface of the plate carries the two electric contact faces that are complementary to the faces 109 to 111. The second faces may be extended laterally to be connected to the wire of the electric link cable.

It should be noted that the chimney constitutes a rod that is hollow inside.

The mounting rod 208, in threaded or hollow form with mounting hooks, crosses the flange 112 and is used to mount the second sub-assembly of the connector.

These three faces 109 to 111 are set off angularly from each other and separated as described above by the insulating projections 123. One will appreciate that the tracks 127 rigidify the arms 113 and the cover 100 made of plastic and molded on the tracks 127. The position of the tabs 125 and the form of the tracks 127 can be adapted based on the application.

The tabs 125 are hollow and generally C-shaped, or U-shaped in a variant, to mount by crimping outputs of the phases of the stator. In a variant, the tabs solid for weld-mounting outputs of the phases of the stator. In a variant, the tabs are replaced with tongues or with eyelets. The connection inputs of the phases 125 may have different shapes and belong, with the electric connection tracks 127 in the form of metal blades and the phase connector 102 to an electrical connection mechanism of the phases carried by the cover 100. We will note that the bottom 117 has a wall (not referenced) to separate and electrically insulate two of the tracks 127.

As a variant, at least one of the portions 128, 129 is replaced with electrical conductors, such as electric circular, rectangular or oval wires. For example, an electric wire connects the face 109 to 111 to the associated tab 125. The wires on the parts 109 to 111,125 are mounted by welding for example.

The brush holder 104 is smaller than the arm 113-phase connector 102 assembly. The connector 1043 is arranged on the bottom 117 of the cover 100 and is made in one piece with the cover. This connector 104 is offset in relation to the brush holder and projects on the external periphery of the cover 100 so that it is radially accessible from the outside.

As previously indicated, it is generally radially oriented and extends parallel to the phase connector 102. These connectors are installed at the level of the opening 151 for passage of the connector 106 so that they rigidify the skirt 115.

The connectors 102, 104 are axially offset in relation to the slip ring 106 and in the opposite direction of the bearing 14. The connector 106 is in one fabrication variant installed circumferentially between the connectors 104, 102.

The connector 104 has two pins 131, each for an electric potential, which are radially oriented and electrically connected to an electrically conducting track 133 for connection to the brush holder 135, which is made in the form of a separate piece mounted under the bottom 117 of the cover. The tracks 133 are metal and sunk in the bottom 117 of the cover. The tracks 133 rigidify the cover and are mounted on the cover using the technology of molding with a casting used in the same way as for the three tracks 127. The brush holder is shown on FIG. 6 and designated by reference 135. In a variant the tracks 133 are replaced with electrical conductors, such as circular, rectangular or oval wires.

The brush holder 135 is simplified in relation to the holder in the previous art, and has a part in the form of a support plate 137, which is L-shaped, which carries the housing 139 of the brushes at one end, while the end of the other arm and the zone of the angle are adapted to allow mounting the brush holder on the cover. We see in FIG. 6 two holes 141 for passage of mounting studs, not shown, which coincide with passage holes 143 for the same studs in the bottom 117 of the cover 100. These studs are anchored in the rear bearing like the one in FIG. 1 and form, at the same time, studs for mounting the cover to the bearing. The application is made by screwing a nut on the free end of each stud. FIG. 3 shows the nuts screwed on the studs at 142.

Of course, the circular counterbores (not referenced) are placed at the level of the holes 143. These counterbores serve as a housing for the nuts 142 that are supported on the bottoms of the counterbores using a screw washer. The bottom of the counterbore and the hole 143 are, in one fabrication method, delimited by a metal washer integrated in the cover using the technique of molding from a casting. These washers prevent creep of the material from the cover.

The L-shaped plate 137 is made of electrically insulating material, advantageously of moldable plastic, and holds two annular electrical contacts 145, which are intended to establish electrical connections with the tracks 133 of the brush holder connector 104. The contact is made using a stripped contact 148 placed at the end of each track 133 sunk in the bottom of the cover; the contacts 145 each have a screw for screwing a nut that is placed on the eyelet with the interposition of a tightening washer. The contacts 145 are electrically connected to the brushes.

Given that the housing 139 of the brushes of the brush holder project from the support plate 137, the bottom 117 of the cover 100 projects axially toward the outside of the zone 147 where the housing 139 is located when the brush holder is mounted on the wall 117 of the cover. This projecting zone 147 is extended by ribs 149 in the direction of the brush holder connector 104. The ribs delimit an oblong opening for the passage of air.

The metal tracks 133 are sunk in these ribs and the wall of the cover in the zone 147 so that they are winding and rigidify the zone 147 and the ribs 149. This zone 147 also has counterbores to accept the nuts associated with the eyelets 148.

Referring to FIG. 3, we see that the cover 100 is emptied as described above into a portion of its external peripheral skirt 115 to allow the passage of the connector 106, which also has radial access, from the sensor holder when the rotating electrical machine is an alternator-starter. The sensor holder, which is the type known, such as the example shown at 257 in FIG. 9 of document WO 01/69762 is mounted under the bottom 117 of the cover and is capped by the cover. The configuration and the mounting of the sensor holder are described in detail in this document. The sensor holder is mounted using two studs which are integrated with the rear bearing 14, and only the two nuts 153 are visible in FIG. 3. These studs allow both the mounting of the sensor holder under the cover 100 and the mounting of the cover on the rear bearing. The stud passage holders are indicated at 155 on FIGS. 4 and 5 and are associated with counterbores to accept the nuts 153, in the same way as the counterbores associated with the nuts 142, with a metal washer integrated with the cover and delimiting the bottom of the counterbore and the hole 155 to prevent creep of the material from the cover.

In a variant, the rotating electrical machine is an alternator, which does not require the presence of a sensor holder; the hollow 151 at the periphery of the cover 100 is not provided since there is no connector 106.

In this case, the cavity of the cover houses only the brush holder. In a variant, for reasons of standardization, the hollow 151 is retained.

In this type of machine, the rectifying device for the alternating current produced by the wound stator that forms the armature of the alternator has, in a known manner, at least one diode bridge. For more information, refer for example to document FR A 2 297 513 which shows a rectifying device with two diode bridges with triangle or start connections from the armature windings of the stator, in which the phases outputs are intended to be connected to the bridges. Thus, this device is offset in relation to the alternator, which is advantageous when several bridges are provided; there is no risk that the rear bearing will be obstructed by the bridges.

For information, the device that rectifies the alternating current of an alternator-starter usually has a power transistor bridge, for example the MOSFET type, as described in document FR B 2 745 444 to which we will refer for more details.

The electronic command and control module thus has, in this case, a power module comprised of the transistor bridge and a control and interface module, which controls the transistors of the power module. This control module manages the following functions: power in starter and alternator modes, regulation in alternator mode, the transition from starter mode to alternator mode.

In all cases, the phase outputs are connected to a phase connector intended to be connected to an exterior electronic module, i.e. offset in relation to the rotating electrical machine; said electronic module has at least the rectifying device for the alternating current produced by the stator.

It should also be noted that, to recover the mounting tabs of the phase outlets 125 on the periphery of the cover, the cover has a secondary cover element 157, in the form of a circle arc that is mounted on the appropriate zone of the periphery of the cover, as is seen in FIG. 7. This cover 157 is for mounting on the cover 100 and is of electrically insulating material, advantageously moldable plastic material. The secondary cover 157 has hollow bosses to house the phase connection tabs 125. The cover 157 is advantageously returned by locking on the cover 100. For example, it has in the center a locking tab supported at the free end to engage with a shoulder of the cover 100.

Figure 4:
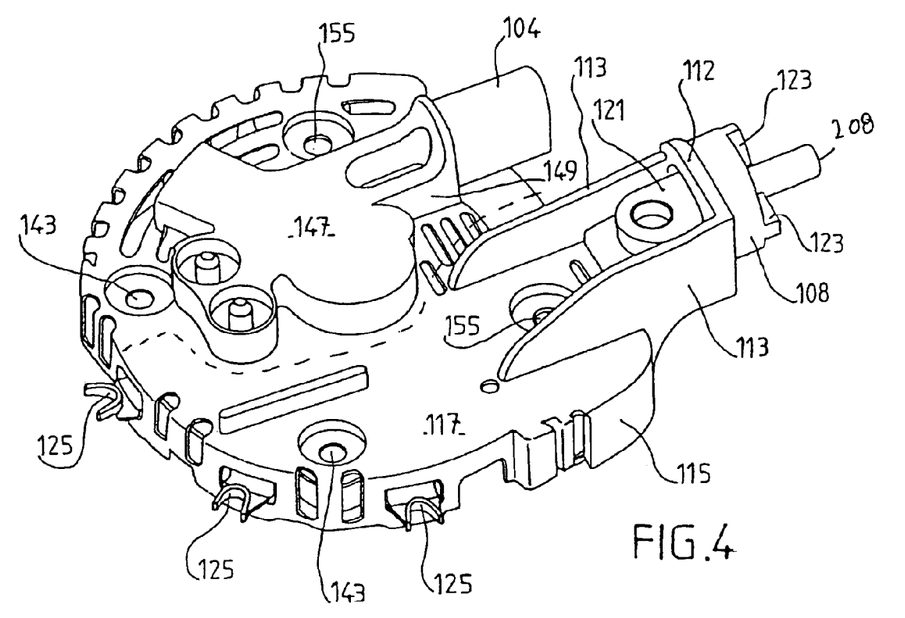
FIG. 4 is a perspective of a cover according to the invention, intended to equip a rotating electrical machine that consists of an alternator-starter.

In FIGS. 4 and 5, we see that the skirt 115 has between two tabs 125 a notch, the bottom of which supports the supported tab, in the form of a hook. The circumferential edges of the cover 157 are each engaged in an axial air passage opening of the skirt 115 so that it cannot rotate. In a variant, the cover has an extension to cover the contacts 145 and the eyelets 148.

The description just given shows that the invention offers a number of advantages. In addition to the external peripheral location of the connectors, and the fact that the connections are made radially from the exterior, it is advantageous that the cover performs the functions of protection and support, which simplifies the structure in comparison to the current art. In addition, the brush holder is fabricated in the form of a distinct part, like the sensor holder. The two parts are mounted under the cover. With the phase connector placed on the periphery of the cover, the size of the cover is reduced. The protuberance is supported by solid arms coming out of the cover and is mounted in addition by a mounting tab to the rear bearing, which rigidities the arms even more and is very strong.

Using the technique of molding from a casting, the cover is advantageously made of thermoplastic material and is equipped with washers or other parts that resist creep at the locations where tightening is performed, notably for mounting the cover to the rear bearing or at the level of the tab 121.

Material is saved at the level of the brush holder 135. This material is different from the material of the cover 100 and is more costly than the material of the cover 100, because it is used to guide the brushes. We reduce the costs of the brush holder 135 particularly since (1) the brush holder, which has no connector, is fabricated more economically in the cover 100 and (2) has shortened electrical links because of the presence of the tracks 133 integrated in the cover 100.

The secondary cover 157 is advantageously of a more economical material than the material of the brush holder and the cover, because it does not guide brushes, nor is it used to house electrical tracks.

Of course, this invention is not limited to the fabrication example described.

For example, the arm linking flange 113 is, in a second method for fabricating the invention perpendicular to the flange 112 in FIG. 7, so that the threaded rod 208 extends axially as well as the phase connector 106. Of course, we can orient the rod 208 purely radially.

As a variant, the flange 112 is slanted as well as the phase connector.

The angle of the flange is, in one variant, fabricated by angling the arms 113. In a variant, the arms are bent. Thus, the connector can be easily oriented in space.

In a third fabrication method of the invention, the flange 112-arm 113 assembly, which forms the aforementioned projection from the cover, is replaced by a full boss molded with the cover, which is attached directly to the rear bearing. The presence of the tab 121 is, therefore, not crucial; the boss may be mounted on the chimney 209 and extend the protuberance 108 of the connector 106.

In a variant, the boss is mounted on the bearing with the stud associated with the nut 153, which is located between the arms 113 in FIG. 3 so that the presence of the chimney 209 is not required and the number of mounting points are reduced. To do this, the boss carries a support washer in the same way as described for the counterbores associated with the holes 143 and 155. In this case, the threaded part 208 belongs to a screw, the head of which is supported on a washer made of thermoset material mounted using the technique of molding from a casting in the single-piece boss with the protuberance 108. In all cases, the support projection of the phase connector 102 has means for mounting it on the rear bearing 14. The boss may be bent and/or angled at the level of the protuberance 108.

In a fourth method for fabricating the invention, the protuberance 108 of the connector 106 belongs to the skirt 115 or to the bottom 117 of the cover so that the connector 106 is radial or axial in orientation. In a variant, the protuberance 108 does not have a constant thickness so that the connector 108 is angled.

This fourth method of fabrication is interesting in the case of an alternator without sensor holder, because we can use the space available to directly install the mounting tabs 125 of the phases directly at the level of the faces 109 to 111 inside the cover 100 so that the presence of the tracks 127 is not mandatory.

In a fifth method of fabricating the invention, the cover is in two parts, i.e. a first part comprised of the tracks 127, the arms 113 and the connector 106, and a second part comprised of the tracks 133, the zone 147 and the connector 104. We have shown in dotted lines on FIG. 4 the line separating the two parts. This allows standardization of one of the parts; the other part is adaptable based on the application.

Thus, the first part can be equipped with a phase connector according to methods 2 to 4 for fabricating the invention. In one variant, the connector 102 is oriented and/or placed differently, for example axially.

The connector 104 does not necessarily belong to the cover. In a variant, it belongs to the brush holder 135 which, in one variant, also holds the voltage regulator.

Of course, the connector 104 does not necessarily have radial access; it may be angled and/or have an axial orientation, like connector 102. All combinations are possible.

This connector 104 may have another form and be a female connector, just like the connectors 102 or 106.

Depending on the application, the connectors 104 and 102 are, in one variant, farther from each other.

The tracks 127 (in one variant), or the electrical conductors 127 (in other fabrication method) only affect the skirt 115 or only the bottom 117 and/or only the arms 113 or, generally, the projected molded with the protuberance 108. The tracks 127 are sunk in all cases at least partially in the project. This is also the case for the tracks of electrical conductors that can only affect the skirt 115 and/or the connector 104.

Of course, instead of using studs to mount the cover to the rear bearing, we can use screws, the heads of which are supported on the cover, advantageously reinforced at this location with a washer resistant to creep, and the threaded part is screwed into a boss coming from the rear bearing. In a variant, the cover is mounted to the rear bearing by riveting, gluing or any other mounting method.

As described above, the electronic module does not have to have a voltage regulator. It is offset in relation to the rotating electrical machine.

In a variant, the phase connector is the same type as described in DE A 100 41 986 (FR A 2 799 053), and the projection coming out of the cover may then be in the form in FIG. 2 of this document.

The invention claimed is:

1. A polyphased rotating electrical machine comprising:
   an outer frame comprising a rear bearing;
   a protective outer cover configured to be mounted on the rear bearing;
   a polyphased wound stator comprising a plurality of phase outputs; and
   a phase connector configured to connect to the plurality of phase outputs and configured to connect to an exterior electronic module,
   wherein the phase connector and the protective outer cover are the same part, and
   wherein the protective outer cover is a complementary cover to the rear bearing and facilitates variable positioning of the phase connector in relation to a brush holder.

2. The polyphased rotating electrical machine of claim 1, wherein the cover comprises electrically insulating material.

3. The polyphased rotating electrical machine of claim 1, wherein the polyphased rotating electrical machine is an alternator.

4. The polyphased rotating electrical machine of claim 1, wherein the polyphased rotating electrical machine is an alternator-starter.

5. A polyphased rotating electrical machine comprising:
   an outer frame comprising a rear bearing;
   a protective outer cover configured to be reciprocally mounted on the rear bearing, wherein
      the protective outer cover facilitates variable positioning of the phase connector in relation to a brush holder;
   a polyphased wound stator comprising a plurality of phase outputs; and
   a phase connector configured to connect to the plurality of phase outputs and configured to connect to an exterior electronic module,
   wherein the phase connector is supported on a first projection extending from the protective outer cover, and
   wherein the protective outer cover is a complementary cover to the rear bearing.

6. The polyphased rotating electrical machine of claim 5, wherein the first projection is configured to be mounted on the rear bearing.

7. The polyphased rotating electrical machine of claim 6, wherein the first projection is arranged on an external peripheral portion of the cover.

8. The polyphased rotating electrical machine of claim 7, wherein the phase connector is offset by the first projection to a location beyond the external peripheral portion of the cover.

9. The polyphased rotating electrical machine of claim 6, wherein the first projection comprises support arms extending from the cover.

10. The polyphased rotating electrical machine of claim 9, wherein the cover comprises an external peripheral skirt and a bottom, and the support arms are integrated with the external peripheral skirt of the cover and the bottom of the cover.

11. The polyphased rotating electrical machine of claim 9, wherein the support arms are connected by a flange that carries the phase connector.

12. The polyphased rotating electrical machine of claim 11, wherein the phase connector has a rod crossing the flange and the rod is integrated with a support tab attached to the rear bearing.

13. The polyphased rotating electrical machine of claim 12, wherein the support tab is supported on a chimney integrated with the rear bearing and is perforated for the passage of a mounting element in the chimney.

14. The polyphased rotating electrical machine of claim 13, wherein the phase connector comprises a hollow protuberance carried by the flange, the rod crosses the flange and the protuberance, and the support tab comprises a second projection mounted inside the protuberance.

15. The polyphased rotating electrical machine of claim 14, wherein the second projection is supported on a perforated part, which is perforated for passage of the rod, and the perforated part is made of thermoset plastic material resistant to creep attached by cast molding to the inside of the protuberance.

16. The polyphased rotating electrical machine of claim 15, wherein the rod is threaded.

17. The polyphased rotating electrical machine of claim 11, wherein the phase connector is connected to phase connection inputs by electrical conductors at least partially sunk in the first projection.

18. The polyphased rotating electrical machine of claim 17, wherein the electrical conductors comprise electrical tracks, and at least two electrical tracks are installed, each electrical track connected to an electrical contact face of the phase connector.

19. The polyphased rotating electrical machine of claim 18, wherein the electrical tracks are sunk in the cover, in the support arms, and in the flange.

20. The polyphased rotating electrical machine of claim 5, wherein the phase connector is connected to phase connection inputs by electrical conductors at least partially sunk in the first projection, and the phase connection inputs extend to the external periphery of the cover and are covered by a secondary cover mounted on the cover and made of electrically insulating material.

21. The polyphased rotating electrical machine of claim 20, wherein the secondary cover is in the shape of a circle arc, the phase connection inputs comprise mounting tabs, and the secondary cover has hollow bosses configured to house the mounting tabs.

22. The polyphased rotating electrical machine of claim 5, wherein the brush holder is covered by the cover and is associated with a brush holder connector, and the brush holder connector is integrally formed with the cover.

23. The polyphased rotating electrical machine of claim 22, wherein the cover has a bottom, and the brush holder connector is connected to the brush holder by electrically conducting tracks sunk in the bottom of the cover.

24. The polyphased rotating electrical machine of claim 23, wherein the polyphased rotating electrical machine is an alternator-starter further comprising:
 a sensor holder; and
 a sensor holder connector,
 wherein the sensor holder is mounted under the bottom of the cover, and the sensor holder connector passes radially through an opening in a peripheral annular wall of the cover.

25. The polyphased rotating electrical machine of claim 22, wherein the cover comprises two parts, one part has the phase connector and the other part covers the brush holder.

* * * * *